United States Patent Office 2,899,453
Patented Aug. 11, 1959

2,899,453

PREPARATION OF DIPHENYLSILANEDIOL

Marshall L. Spector, Ballston Lake, and Roger P. Strang, Valley Falls, N.Y., assignors to General Electric Company, a corporation of New York No Drawing. Application January 31, 1957
Serial No. 637,363

4 Claims. (Cl. 260—448.2)

This invention is concerned with a process for making diphenylsilanediol. More particularly the invention relates to a process for obtaining rapid and essentially quantative yields of diphenylsilanediol (hereinafter for brevity referred to as "diol"), which comprises (1) hydrolyzing diphenyldichlorosilane in water wherein the water comprises, by weight, at least 2 parts (e.g., from 2 to 50 or more parts) per part of diphenyldichlorosilane, (2) separating the crude formed diol in a wet state and contaminated with HCl, (3) thereafter dissolving the crude diol in a mixture of acetone and a bicarbonate selected from the class consisting of sodium bicarbonate and potassium bicarbonate, the bicarbonate being present in an amount sufficient to neutralize essentially all the HCl present and to yield a pH in the neutralized mixture of from 5.5 to 6.8, and (4) thereafter isolating the formed diol.

Diphenylsilanediol is an important material used in the manufacture of silicone resins and rubbers. In addition, it has been found to be useful as an additive for organopolysiloxanes convertible to the cured, solid, elastic state for the purpose of preventing undesirable nerve and structure when the convertible organopolysiloxane is in intimate contact with certain finely divided silica fillers as is more particularly disclosed and claimed in the copending application of Richard M. Savage and Wilbur J. Wormuth, Serial No. 399,148, filed December 18, 1953, and assigned to the same assignee as the present invention.

U.S. Patent 2,646,441—Duane, describes a process for making diphenylsilanediol by adding diphenyldichlorosilane to an anhydrous slurry of acetone and a bicarbonate such as potassium bicarbonate or sodium bicarbonate. However, this process has several disadvantages. In the first place, undesirably large amounts of acetone and the bicarbonate are required to satisfactorily carry out the process. In addition the conversion of the diphenyldichlorosilane to the diol is accompanied by the formation of undesirably high molecular weight fluids, probably condensation products of the diol. These condensation products tend to contaminate the more desirable diol and prevent adequate separation of the latter and the attainment of optimum yields. The formation of these high molecular weight products may be repressed to some extent by exercising a critical balance between the rate of addition of the diphenyldichlorosilane and the degree of agitation. These high molecular weight products are usually obtained if the addition of the diphenyldichlorosilane is too fast or the agitation is too slow. We have unexpectedly now discovered that contrary to the teachings of U.S. 2,646,441 we are able to obtain essentially quantative yields of diphenylsilanediol rapidly and economically, and the diol obtained is of a high degree of purity. In accordance with our invention, diphenyldichlorosilane is hydrolyzed in water, the crude wet diol contaminated with HCl is then dissolved in acetone and a sufficient amount of a bicarbonate of the above class used to neutralize the HCl in the acetone to give a pH of 5.5 to 6.8. The neutralized diol solution in acetone can then be filtered to remove inorganic salts, and the diol caused to precipitate by combining the acetone solution with a sufficient amount of water. The precipitated diol can then be dried, for instance, at 40 to 70° C. to give a product of good purity.

By means of our invention, we are able to prevent undesirable condensation of the diphenylsilanediol to higher molecular weight fluids which do not have the range of usefulness that the monomeric diphenylsilanediol has. This is due to the fact that in our process, as the diphenyldichlorosilane is added to the water of hydrolysis, the diol is precipitated as a solid. In this solid state it is substantially non-reactive with the incoming liquid diphenyldichlorosilane and therefore the usual condensation between diphenyldichlorosilane and diphenylsilanediol is less apt to take place.

In contrast to this, when employing the process disclosed in the above-mentioned Duane Patent 2,646,441, the acetone acts as a solvent, not only for the incoming diphenyldichlorosilane, but also acts as a solvent for any formed diphenylsilanediol, thus providing liquid-liquid phases, wherein intimate contact results between the diphenyldichlorosilane and diphenylsilanediol causing the above-described undesirable condensation between the two materials thereby resulting in the formation of the less desirable, contaminating higher molecular weight polymers.

The amount of water used in the initial hydrolysis of the diphenyldichlorosilane advantageously comprises, by weight, at least 2 parts, e.g. from 2 to 50 parts of the latter per part of diphenyldichlorosilane. The amount of acetone required in the subsequent processing is usually no more than that necessary to obtain complete solution of the crude diol; in view of the solubility factors, we have found that on a weight basis the acetone may comprise from 0.5 to 3 or more parts of the latter per part of the crude diol isolated from the initial hydrolysis reaction in water. This crude diol may contain from 10 to 75%, by weight, thereof of water.

The potassium bicarbonate or sodium bicarbonate employed should be sufficient to effect neutralization of the solution to a pH of 5.5 to preferably below 7, for instance, from 5.5 to 6.8. Substantially higher pH's will cause condensation of some of the diol to the less desirable polymeric state thus resulting in yield losses.

The method for carrying out the invention is relatively simple. The diphenyldichlorosilane is added with stirring to the water, the precipitated crude diol removed by filtration and this crude diol which contains some water and is quite highly contaminated with HCl, can then be dissolved in a dispersion of acetone and a sufficient amount of the neutralizing bicarbonate. Alternatively, the crude diol can be first dissolved in the acetone and the sodium bicarbonate or the potassium bicarbonate for neutralization purposes added thereafter. The neutralized solution is then filtered and the filtrate combined with from 1 to 5 times its weight of water to precipitate the diol which again can be removed by filtration and dried at lower temperatures.

In order that those skilled in the art may better understand how the present invention may be practiced, the following example is given by way of illustration and not by way of limitation.

*Example*

400 grams diphenyldichlorosilane was added slowly with stirring over a period of two hours to 2,000 grams water while maintaining the temperature of the reaction mixture between 20–30° C. The precipitated diphenylsilanediol was separated by filtration and while wet and while still contaminated with HCl, was dissolved in 550 grams of acetone. A sufficient amount of sodium bicarbonate was added to neutralize the HCl in the acetone solution to give a pH of about 6.5. The mixture of ingredients was filtered to remove inorganic salts and the acetone solution filtrate containing the diol was added to 2,800 grams of water in order to precipitate the diol. The diol was removed by filtration and dried in an air-circulating oven at about 65° C. for 24 hours. There was thus obtained about 320 grams of diphenylsilanediol which represented a yield of about 93.4%. This material had a melting point of 157.8–158.4° C.

It will of course be apparent to those skilled in the art that other proportions of ingredients and conditions, as well as potassium bicarbonate may be employed in place of proportions, conditions and sodium bicarbonate described in the foregoing example. Our process can be advantageously employed in obtaining diphenylsilanediol of good purity even though the original diphenyldichlorosilane may be contaminated with up to 10 weight percent phenyltrichlorosilane. Ordinarily it might be expected that the presence of phenyltrichlorosilane would cause resinification. However, we have unexpectedly found that technical grade diphenylsilanediol can be obtained by our process despite the presence of the phenyltrichlorosilane in combination with the diphenyldichlorosilane.

What we claim as new and desire to secure by Letters Patent of the United States is:

1. The process for making diphenylsilanediol which consists essentially of (1) hydrolyzing diphenyldichlorosilane with water, (2) separating the formed crude diphenylsilanediol, (3) dissolving the crude diphenylsilanediol in acetone and neutralizing the acetone solution to a pH of from about 5.5 to 6.8 with a bicarbonate selected from the class consisting of potassium bicarbonate and sodium bicarbonate, (4) precipitating the diphenylsilanediol with water from the acetone solution and (5) isolating the formed diphenylsilanediol.

2. The process as in claim 1 in which the crude diphenylsilanediol derived from the initial hydrolysis step is added to a mixture composed of acetone and sodium bicarbonate.

3. The process as in claim 1 in which the crude diphenylsilanediol derived from the initial hydrolysis step is dissolved in acetone, and sodium bicarbonate is added to the acetone solution to effect neutralization of the acetone solution to a pH of about 5.5 to 6.8.

4. The process as in claim 3 wherein the sodium bicarbonate is replaced by potassium bicarbonate.

References Cited in the file of this patent

UNITED STATES PATENTS

| | | |
|---|---|---|
| 2,590,812 | Barry | Mar. 25, 1952 |
| 2,719,859 | Nitzsche et al. | Oct. 4, 1955 |

OTHER REFERENCES

Kipping: "Jr. Chem. Soc.," vol. 101 (1912), pp. 2108–25.

Kipping: "Jr. Chem.," vol. 101 (1912), pp. 2125–42.

Kipping et al.: Ibid., vol. 105 (1914), pp. 484–500.

Burkhard: "Inorganic Synthesis III (1950), pp. 62–3, McGraw-Hill Book Co., Inc., publishers.

Nametkin et al.: "Doklady Akad. Nauk.," SSSR, vol. 93 (1953), pp. 495–7 (49 Chem. Abstr. 3049g).